US012024857B2

(12) United States Patent
Das et al.

(10) Patent No.: US 12,024,857 B2
(45) Date of Patent: Jul. 2, 2024

(54) TRACTOR CAB OPERATOR PLATFORM

(71) Applicant: DEERE & COMPANY, Moline, IL (US)

(72) Inventors: Sushanta K. Das, Grovetown, GA (US); Carl E. Caldwell, II, Cedar Falls, IA (US); Paul M. Elhardt, Charlotte, NC (US); Jawahar R. Naidu, Pune (IN); Nicholas M. Toomey, Evans, GA (US)

(73) Assignee: DEERE & COMPANY, Moline, IL (US)

( * ) Notice: Subject to any disclaimer, the term of this patent is extended or adjusted under 35 U.S.C. 154(b) by 384 days.

(21) Appl. No.: 16/948,017

(22) Filed: Aug. 27, 2020

(65) Prior Publication Data
US 2022/0018093 A1    Jan. 20, 2022

(30) Foreign Application Priority Data

Jul. 16, 2020 (IN) .............................. 202021030316

(51) Int. Cl.
*E02F 9/16* (2006.01)
*B60H 1/00* (2006.01)

(52) U.S. Cl.
CPC ......... *E02F 9/163* (2013.01); *B60H 1/00207* (2013.01); *B60H 1/00378* (2013.01); *B60H 1/00564* (2013.01); *E02F 9/166* (2013.01); *B60H 2001/00221* (2013.01)

(58) Field of Classification Search
CPC ...... E02F 9/163; E02F 9/166; B60H 1/00207; B60H 1/00378; B60H 1/00564; B60H 2001/00221; B60H 1/00357; B60H 1/00028; B60H 1/246; B60H 1/0055; B60H 2001/2293; B62D 33/0617
USPC .... 296/208, 190.08, 190.09, 190.01, 190.03; 165/202–204; 62/244
See application file for complete search history.

(56) References Cited

U.S. PATENT DOCUMENTS

| 4,072,487 | A |   | 2/1978  | Irwin |
|-----------|---|---|---------|-------|
| 4,144,719 | A |   | 3/1979  | Williams et al. |
| 4,721,031 | A |   | 1/1988  | Nakata et al. |
| 4,874,036 | A | * | 10/1989 | Masuda ............... B66F 9/07595 |
|           |   |   |         | 237/12.3 A |

(Continued)

FOREIGN PATENT DOCUMENTS

| BE | 887803 A     | * | 7/1981 | ......... B60H 1/00371 |
| DE | 102014103574 A1 | * | 9/2015 | ......... B60H 1/00378 |

(Continued)

OTHER PUBLICATIONS

Extended European Search Report and Written Opinion issued in European Patent Application No. 21176070.7, dated Oct. 18, 2021, in 09 pages.

*Primary Examiner* — Amy R Weisberg
*Assistant Examiner* — Wenwei Zhuo

(57) ABSTRACT

A tractor cab operator platform includes a composite floor holding a heating, ventilation and air conditioning unit, a plurality of blowers, and a plurality of openings for air filters. The composite floor may have a plurality of airflow passages between the plurality of air filters, the plurality of blowers and the heating, ventilation and air conditioning unit. An operator seat may be removably mounted on a seat pan over the heating, ventilation and air conditioning unit.

5 Claims, 4 Drawing Sheets

(56) References Cited

U.S. PATENT DOCUMENTS

| | | | | |
|---|---|---|---|---|
| 5,183,314 A * | 2/1993 | Lorbiecki | ............ | B60N 2/0155 |
| | | | | 297/DIG. 2 |
| 5,273,340 A * | 12/1993 | Nelson | ................... | B62D 33/06 |
| | | | | 296/190.08 |
| 6,780,097 B2 | 8/2004 | Shuttleworth et al. | | |
| 6,938,677 B2 * | 9/2005 | Yamakawa | ............ | B60H 1/323 |
| | | | | 237/12.3 A |
| 7,004,533 B2 * | 2/2006 | Arthur | ................... | B62D 25/16 |
| | | | | 296/190.08 |
| 7,252,585 B2 | 8/2007 | Ichikawa et al. | | |
| 7,334,834 B2 | 2/2008 | Hill et al. | | |
| 8,033,899 B2 | 10/2011 | Ichikawa et al. | | |
| 8,366,524 B2 | 2/2013 | Ichikawa et al. | | |
| 8,376,817 B2 | 2/2013 | Ichikawa | | |
| 8,459,727 B2 * | 6/2013 | Mayr | ................... | B60H 1/0055 |
| | | | | 454/144 |
| 8,474,562 B2 | 7/2013 | Elhardt et al. | | |
| 8,485,589 B2 * | 7/2013 | Obe | ........................ | E02F 9/163 |
| | | | | 296/190.09 |
| 8,528,965 B2 | 9/2013 | Nagami et al. | | |
| 9,011,220 B2 * | 4/2015 | Mayr | ................. | B60H 1/00378 |
| | | | | 454/139 |
| 9,227,481 B2 | 1/2016 | Ichikawa | | |
| 9,481,223 B2 | 11/2016 | Ichikawa | | |
| 2006/0170251 A1 * | 8/2006 | Ishii | ................... | B60H 1/00378 |
| | | | | 296/190.09 |
| 2006/0186224 A1 * | 8/2006 | Yoshii | ................ | B60H 1/00378 |
| | | | | 239/548 |
| 2007/0145781 A1 * | 6/2007 | Haboon | ............ | B60H 1/00378 |
| | | | | 296/190.09 |
| 2012/0134768 A1 * | 5/2012 | Kimura | .................... | E02F 9/166 |
| | | | | 414/687 |
| 2013/0203333 A1 * | 8/2013 | Amura | ................. | B60H 3/0608 |
| | | | | 454/158 |
| 2013/0302125 A1 * | 11/2013 | Tabeta | .................. | E02F 9/0858 |
| | | | | 414/687 |
| 2014/0166233 A1 * | 6/2014 | Wehrenberg | ....... | B60H 1/00535 |
| | | | | 165/42 |
| 2020/0164723 A1 * | 5/2020 | Ferri | ...................... | B01D 46/44 |

FOREIGN PATENT DOCUMENTS

| | | | | |
|---|---|---|---|---|
| DE | 102014204972 A1 | 9/2015 | | |
| EP | 2371587 A2 | 10/2011 | | |
| EP | 2428376 A1 * | 3/2012 | ......... | B60H 1/00378 |
| EP | 2474432 A1 | 7/2012 | | |
| JP | H08318728 A | 12/1996 | | |
| WO | WO2010049381 A1 | 5/2010 | | |

* cited by examiner

TRACTOR CAB OPERATOR PLATFORM

CROSS REFERENCE TO RELATED APPLICATIONS

This application claims priority under 35 USC 119 to Indian patent application 202021030316 filed Jul. 16, 2020, the disclosure of which is incorporated herein by reference.

FIELD OF THE INVENTION

The present invention relates to a tractor cab operator platform with composite floor and an integrated heating, ventilation and air conditioning system.

BACKGROUND OF THE INVENTION

Utility tractor cabs may have air conditioning units and ducts located on or inside the roof. For example, U.S. Pat. No. 7,334,834 for "Tractor Cab Roof with Integral Air Ducts" assigned to Deere & Company describes an evaporator/heater core mounted on the rear panel of a tractor cab roof, and air ducts between the upper roof member and left and right side panels. A tractor cab platform is needed with an integrated heating, ventilation and air conditioning ("HVAC") system that helps minimize height of the cab, provides easier access to the HVAC system for service, improves temperature distribution inside the cab, and may be assembled prior to installation on a tractor.

SUMMARY OF THE INVENTION

A tractor cab operator platform includes a composite floor having a rear wall, a central portion under an operator seat, and a front floor area. The tractor cab operator platform also includes a heating, ventilation and air conditioning unit that is fully recessed in a chamber in the central portion of the composite floor. A plurality of channels in the composite floor may extend forwardly and rearwardly from the chamber and provide an airflow path. A removable seat pan may be provided over the chamber and covers a top surface of the heating, ventilation and air conditioning unit.

DESCRIPTION OF THE PREFERRED EMBODIMENT

Figure 1:
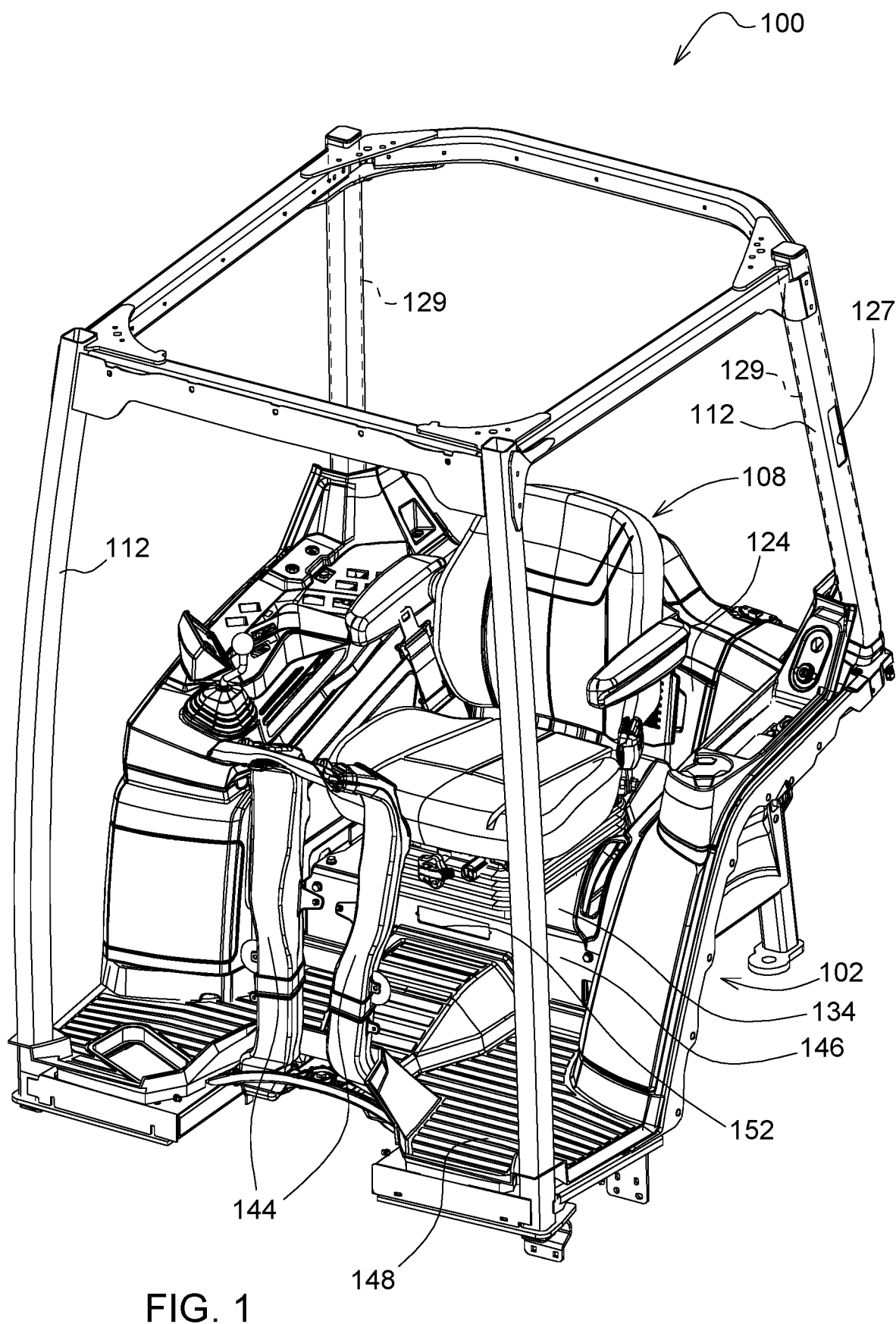
FIG. 1 is a front perspective view of a tractor cab operator platform according to a first embodiment of the invention.
Figure 2:
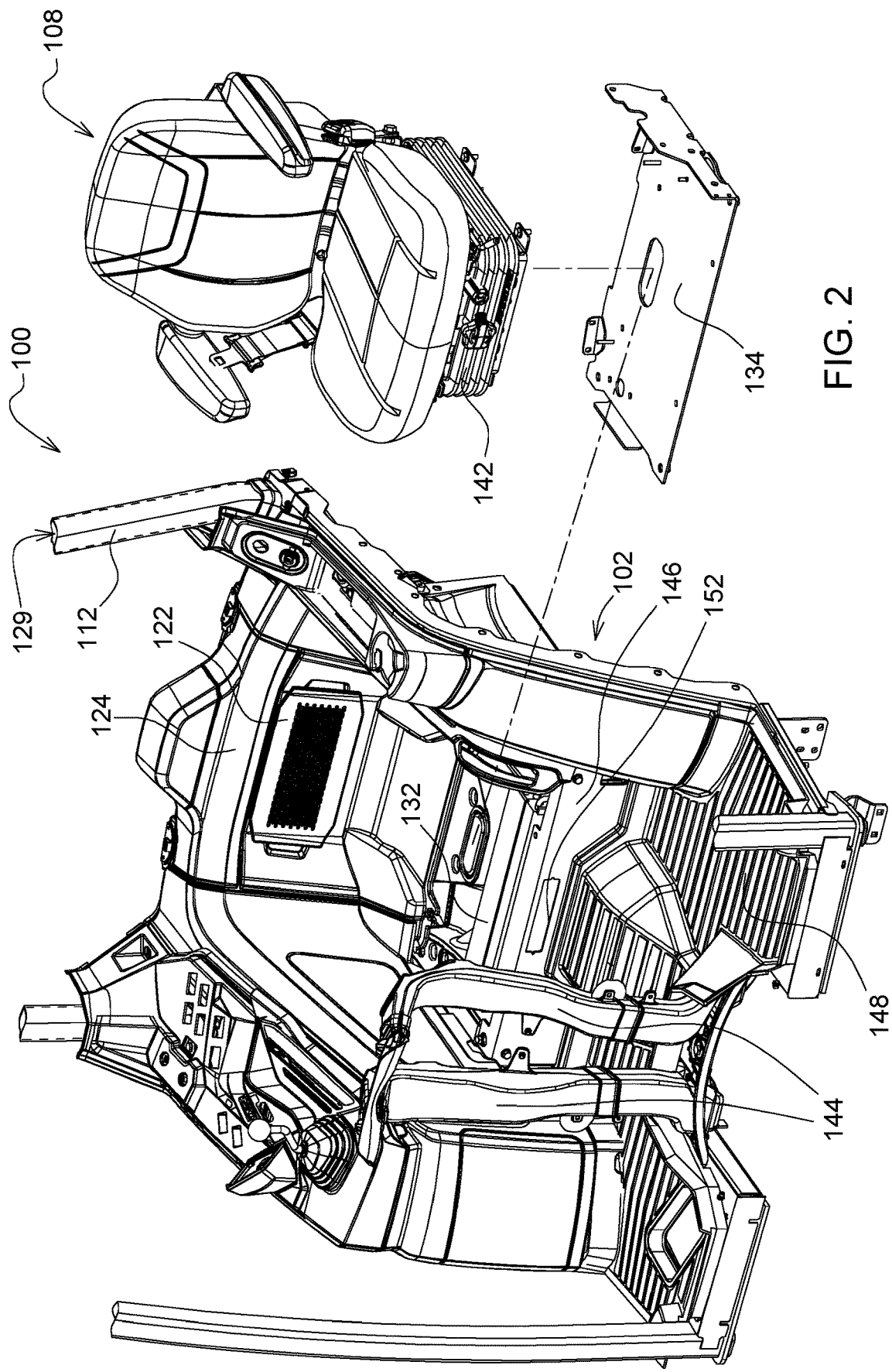
FIG. 2 is a front perspective view of a tractor cab operator platform, with the seat and seat pan exploded, according to a first embodiment of the invention.
Figure 3:
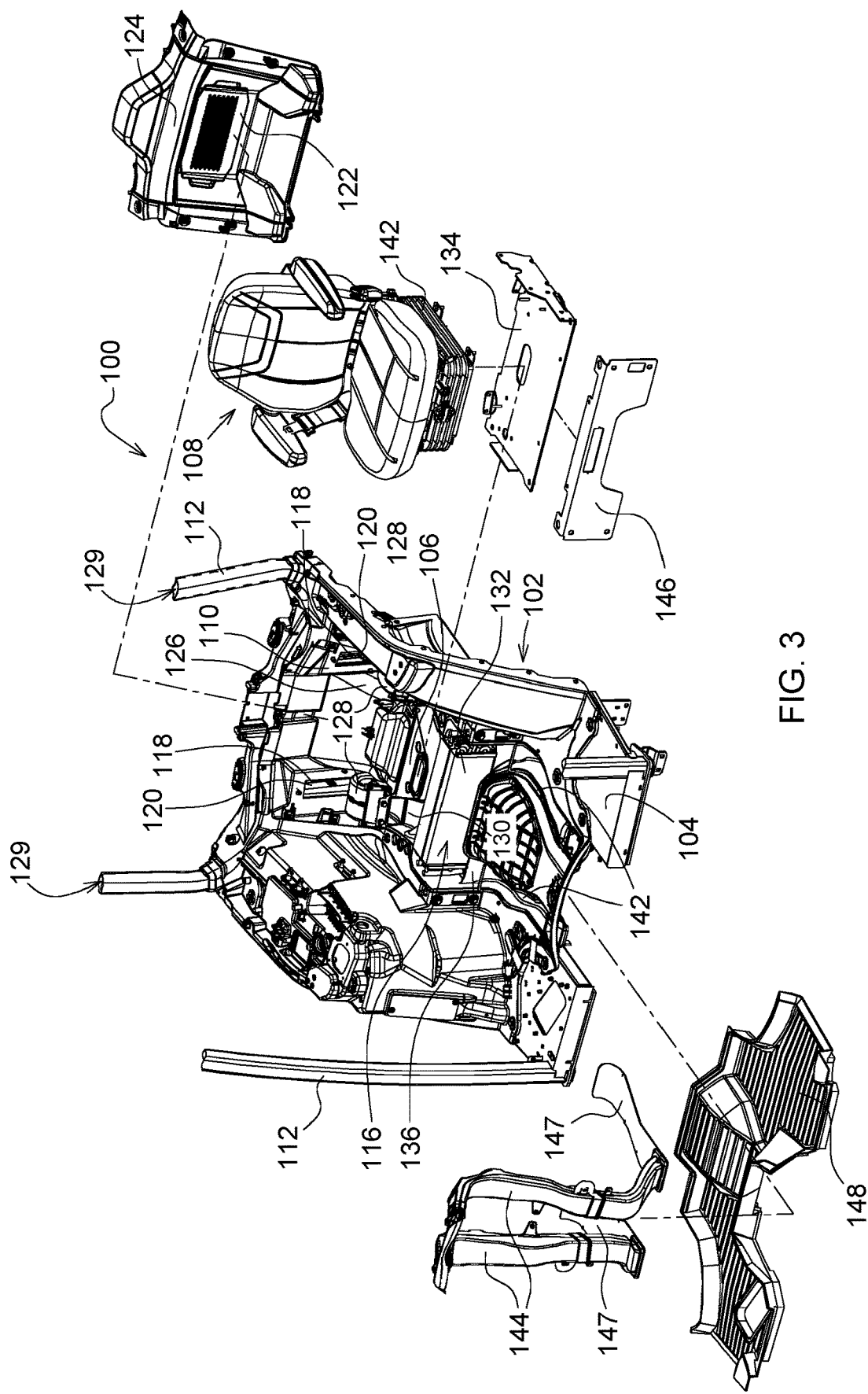
FIG. 3 is a front perspective view of a tractor cab operator platform, with the seat, seat pan, floor panel and upholstery panel exploded, according to a first embodiment of the invention.
Figure 4:
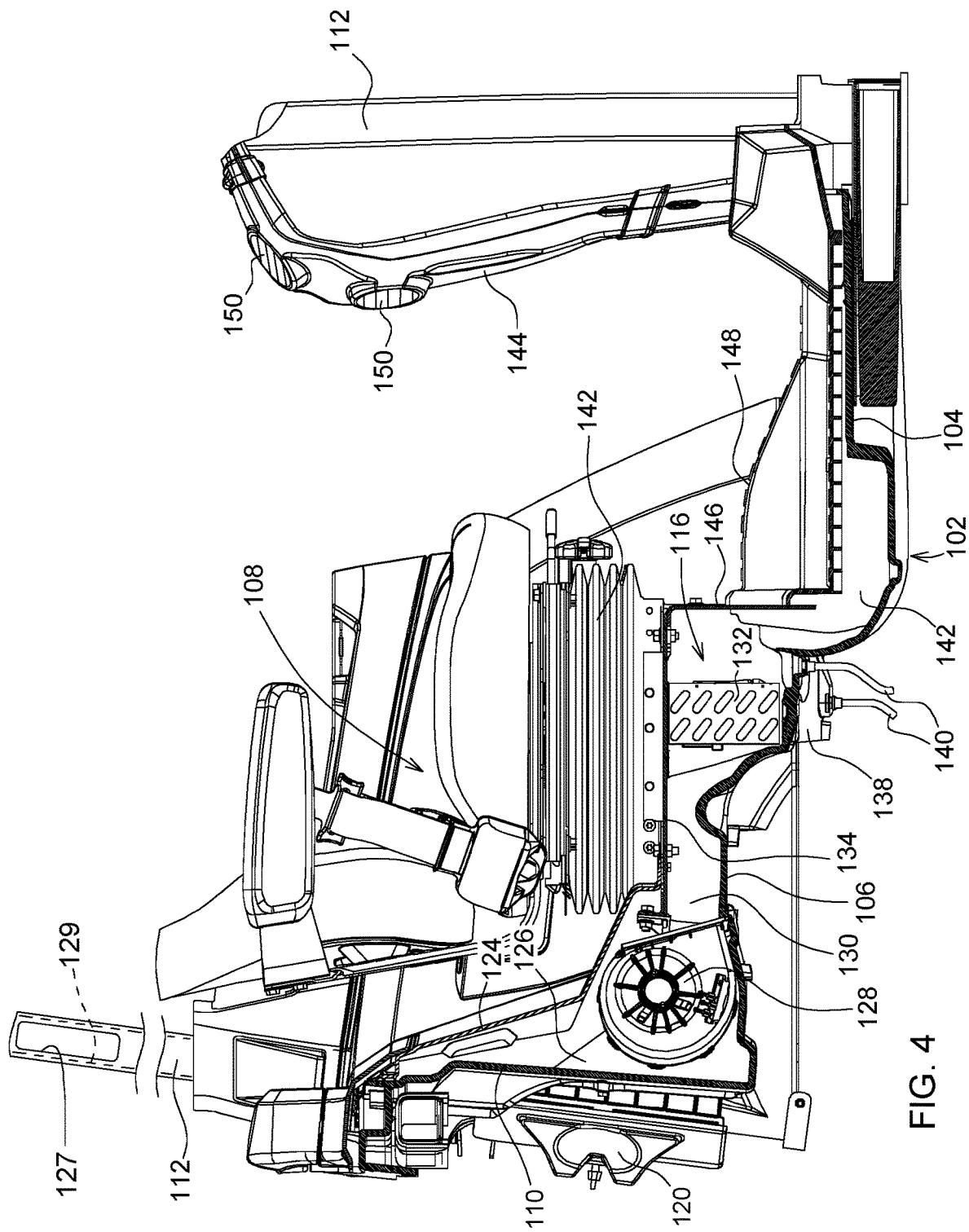
FIG. 4 is a side cross section view of a tractor cab operator platform according to a first embodiment of the invention.

FIGS. 1-4 show one embodiment of tractor cab operator platform 100. The tractor cab operator platform may have composite floor 102. The composite floor may be a one piece molded structure including front floor area 104, central portion 106 under operator seat 108, and rear wall 110 behind the operator seat. The composite floor may include materials such as those described in U.S. Pat. No. 7,004,533 for "Composite Floor for Utility Vehicle" assigned to Deere & Company. For example, the composite floor may include a layer of fiberglass sandwiched by a top first layer of reaction injection molded ("RIM") material and a bottom second layer of RIM material. Alternatively, the composite floor may be constructed using direct long fiber transfer molding. The materials may give the composite floor rigidity and strength while being light weight. The materials may be reinforced with fiberglass material and/or structural foam to add rigidity. The tractor cab operator platform also may include rollover protection system ("ROPS") 112 attached to and supporting the composite floor, and also supporting a roof covering the cab. The ROPS may be a rigid steel structure having upright tubes or posts attached to the vehicle frame, the composite floor, and cab roof.

In one embodiment, tractor cab operator platform 100 may include heating, ventilation and air conditioning ("HVAC") system 116 integrated into composite floor 102. For example, the HVAC system may be assembled to the composite floor before the operator platform is mounted on a tractor frame. The tractor cab operator platform may have an HVAC system that includes an airflow path through air chambers and air ducts molded in the composite floor. The chambers and air ducts may be molded as channels or passages in the composite floor which are covered by panels and/or duct covers that may be removable for servicing the HVAC system. More specifically, the tractor cab operator platform may have an HVAC system with an airflow path from fresh air inlets 127 in ROPS 112, ducts 129 inside he ROPS to fresh air intakes 118 though rear wall 110, HVAC unit 132 that is fully recessed in the central portion of the floor under operator seat 108, to air outlets 150 in front of the operator seat.

In one embodiment, tractor cab operator platform 100 may have integrated HVAC system 116 including fresh air inlets 127 in ROPS 112, and ducts 129 inside the ROPS to fresh air intake openings 118 through rear wall 110 of composite floor 102 behind each side of operator seat 108. Air filters 120 may be mounted in the fresh air intake openings. The tractor cab operator platform also may include recirculated air intake 122 through rear upholstery panel 124 behind the operator seat. A recirculated air filter may be mounted over the recirculated air intake. The fresh air and recirculated air intakes allow air to flow into air mixing chamber 126 located between the rear wall of the composite floor and the rear upholstery panel.

In one embodiment, tractor cab operator platform 100 may have integrated HVAC system 116 including blowers 128 located inside air mixing chamber 126, behind each side of operator seat 108. The blowers may blow air from the air mixing chamber into a plurality of air ducts 130 under the operator seat to HVAC unit 132. Air ducts 130 may be formed as channels or passages molded in central portion 106 of composite floor 102 covered by seat pan 134.

In one embodiment, tractor cab operator platform 100 may have integrated HVAC system 116 including chamber 136 molded in central portion 106 of composite floor 102 under operator seat 108. HVAC unit 132 may be mounted in a fully recessed position in the chamber in the central portion of the composite floor. The HVAC unit may be a combo cooler including an evaporator and heater core. Seat pan 134 may be a generally flat plate positioned horizontally over the chamber and supported by the walls, and attached with fasteners to the walls, of the central portion of the composite floor. The fasteners may be easily removable whereby the seat pan is a service panel for servicing the HVAC unit. The operator seat may include seat suspension 142 mounted on the seat pan and also may be easily removed with the seat pan. The seat suspension may be mounted directly to the seat pan with one or more brackets and hardware, and the composite floor may allow clearance for the mounting points. The composite floor also may include drain pan 138 under the HVAC chamber and HVAC unit, with drain hoses 140 connected thereto.

In one embodiment, tractor cab operator platform 100 may include integrated HVAC system 116 with a plurality of lower air ducts 142 between HVAC unit 132 and air outlet tubes 144. Lower air ducts 142 may be channels or passages molded in composite floor 102 covered by removable kick plate 146 and removable duct covers 147. Additionally, floor panel mats 148 may be positioned over the channels or passages to help seal the air ducts. Each air outlet tube 144 may extend upwardly from the forward end of lower air ducts to air outlets 150 near the front of the operating platform. Additionally, foot vent 152 through the kick plate may allow air flow from the HVAC unit into the operating platform.

In one embodiment, tractor cab operator platform 100 may also include left and right console panels attached to the composite floor on the left and right sides of the operator seat. The console panels may cover channels in the composite floor used for wiring harnesses and related controls.

Having described the preferred embodiment, it will become apparent that various modifications can be made without departing from the scope of the invention as defined in the accompanying claims.

We claim:

1. A tractor cab operator platform, comprising:
  a multiple layer composite floor having a rear wall, a central portion, and a front floor area;
  a heating, ventilation and air conditioning unit, a plurality of blowers, and a plurality of air filters fully recessed under the composite floor;
  a plurality of channels in an upper face of the composite floor extending forwardly and rearwardly from the heating, ventilation and air conditioning unit; and
  a fresh air inlet in a roll over protection system and ducts inside the roll over protection system to a filtered fresh air intake opening through the rear wall.

2. The tractor cab operator platform of claim 1 further comprising an air mixing chamber between the rear wall and an upholstery panel behind the operator seat.

3. The tractor cab operator platform of claim 1 further comprising a floor panel over the channels extending forwardly from the chamber.

4. A tractor cab operator platform, comprising:
  a composite floor holding a heating, ventilation and air conditioning unit, a plurality of blowers, and a plurality of air filters; the composite floor having a plurality of airflow passages in an upper face thereof between the plurality of air filters, the plurality of blowers and the heating, ventilation and air conditioning unit; and
  an operator seat removably mounted over the heating, ventilation and air conditioning unit;
  wherein the heating, ventilation and air conditioning unit is fully recessed in a chamber in the composite floor; and the composite floor includes a rear wall with a plurality of filtered air inlets therethrough.

5. The tractor cab operator platform of claim 4 further comprising a seat pan over the heating, ventilation and air conditioning unit.

* * * * *